(12) United States Patent
Ventura

(10) Patent No.: US 10,822,866 B2
(45) Date of Patent: Nov. 3, 2020

(54) DOOR PEEP VIEWER SYSTEMS

(71) Applicant: Dolores Ventura, Perth Anvoy, NJ (US)

(72) Inventor: Dolores Ventura, Perth Anvoy, NJ (US)

( * ) Notice: Subject to any disclaimer, the term of this patent is extended or adjusted under 35 U.S.C. 154(b) by 0 days.

(21) Appl. No.: 15/360,902

(22) Filed: Nov. 23, 2016

(65) Prior Publication Data

US 2018/0143398 A1 May 24, 2018

(51) Int. Cl.
*E06B 7/30* (2006.01)
*G02B 23/08* (2006.01)

(52) U.S. Cl.
CPC .............. *E06B 7/30* (2013.01); *G02B 23/08* (2013.01)

(58) Field of Classification Search
USPC ........................................................ 359/504
See application file for complete search history.

(56) References Cited

U.S. PATENT DOCUMENTS

| | | | | |
|---|---|---|---|---|
| 3,910,676 A | | 10/1975 | Dobis et al. | |
| 3,973,835 A | * | 8/1976 | Miyakawa | E06B 7/30 359/504 |
| 5,305,140 A | * | 4/1994 | Eloy | G02B 23/08 359/402 |
| 6,400,503 B1 | * | 6/2002 | Mickelson | G02B 23/08 359/402 |
| 2005/0088741 A1 | | 4/2005 | Purser | |

* cited by examiner

*Primary Examiner* — Jennifer D. Carruth
(74) *Attorney, Agent, or Firm* — Runyan Law; Charles Runyan

(57) ABSTRACT

A door peep viewer system allows small stature individuals, children, and those confined to a wheelchair or motorized scooter, the ability to use the peep-hole located within a home's front or rear door. This increases home safety by permitting the identification of someone requesting entry to the home. Once the door peep viewer system is mounted to the door, the lower portion adjustably extends to suit the needs of the person using the device. Persons of average height are still capable of using the peep-hole because the top portion is designed with a two-way see through scope. The door peep viewer system can be used in residential homes, or commercially in hotel rooms.

15 Claims, 5 Drawing Sheets

DOOR PEEP VIEWER SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of personal safety devices and more specifically relates to home security for readily identifying a person or persons at an entry door, a door peep viewer system.

2. Description of Related Art

Many people use their front door peep-holes to screen visitors. The average individual, by looking through the peep-hole is able to discern between a friend and possible threat. The advantages of using a peep-hole are to avoid a home invasion, or a robbery by denying access to unknown individuals to the home. Unfortunately, the average peep-hole height is not conducive for those of short stature or individuals confined to a wheelchair or motorized scooter. These individuals have no choice but to open the door, which may grant entry for someone meaning to do harm. Children often simply open the door, since they have not been trained for using such a precaution. Therefore, a solution is desired to help stop unwanted individuals from gaining entry by allowing any person to identify a person or persons at the door to their home.

Several attempts have been made to solve the above-mentioned problems such as those found in U.S. Pub. No. 2005/0088741 to Brian Purser; U.S. Pat. No. 3,973,835 to Jammie Miyakawa et al.; and U.S. Pat. No. 3,910,676 to Ivan Dobis et al. This art is representative of door safety devices. However, none of the above inventions and patents, taken either singly or in combination, is seen to describe the invention as claimed.

Preferably, a door peep viewer system should provide added security for the disabled and those of small stature and, yet would operate reliably and be manufactured at a modest expense. Thus, a need exists for a reliable door peep viewer system to avoid the above-mentioned problems.

BRIEF SUMMARY OF THE INVENTION

In view of the foregoing disadvantages inherent in the known door safety accessories art, the present invention provides a novel door peep viewer system. The general purpose of the present invention, which will be described subsequently in greater detail is to provide a device that allows virtually anyone to recognize who might be attempting to gain entry into their home.

A door peep viewer system is disclosed herein, in a preferred embodiment, comprising: a door peep viewer assembly comprising an upper cubic portion (having a first-open-inner-volume, a receiving aperture, a first-ninety-degree-elbow, a first-length, a two-way scope, and a top internal two-way forty-five degree angled mirror), a lower cubic portion (comprising a second-open-inner-volume, a second-length a second-ninety-degree-elbow, a bottom internal forty-five degree angled mirror), and a mounting assembly. The door peep viewer assembly comprises in functional combination the upper cubic portion, the lower cubic portion, and the mounting assembly; wherein the upper cubic portion is defined by the first-open-inner-volume, the receiving aperture, the first-ninety-degree-elbow, the first-length, the two-way scope, and the top internal two-way forty-five degree angled mirror. The upper cubic portion is structured and arranged such that the top internal two-way forty-five degree angled mirror is inset within the first-ninety-degree-elbow to permit viewing through a door peep-hole using the two-way scope which is contained and protruding through the upper cubic portion.

Referring to the upper cubic portion; upper cubic portion comprises a fitted molded casting for attaching to the door peep-hole, and further comprises a first rubber-cupped eye piece. The two-way scope of the upper cubic portion preferably comprises a lever activated flip up function allowing view through the door peep-hole by an individual. The upper cubic portion comprises an inward curled lip to receive a rubber ring stopper. The two-way scope comprises a wide angle lens to increase the relative viewing angle. The light weight durable injection molded thermoplastic of the upper cubic portion (when used) comprises molded tabs and screw holes. In reference to the lower cubic portion; the lower cubic portion is defined by the second-open-inner-volume, the second-length, the second-ninety-degree-elbow, the bottom internal forty-five degree angled mirror, the second rubber-cupped eye piece and the rubber ring stopper to prevent dislodging from the upper cubic portion. Furthermore the lower cubic portion, when extended, pivots right and left in preferred embodiments. The present invention may comprise cubic tubing or alternately square profile tubing.

The lower cubic portion is slidably coupleable to the upper cubic portion such that the lower cubic portion is telescopically insertable into the upper cubic portion via the receiving aperture through the first-open-inner-volume. The upper cubic portion and the lower cubic portion preferably comprise light weight durable injection molded thermoplastic (other materials may be used), and are exactly twelve inches in length in preferred embodiments. The mounting assembly may comprise at least one mounting bracket, and at least one fastener (such as screws or the like).

The outer image (person standing at the door), from the door, is viewed through the first-ninety-degree-elbow, reflecting off the top internal two-way forty-five degree angled mirror, (the image) descending through the first-open-inner-volume by way of the first-length, through the second-open-inner-volume of the second-length, and to the bottom internal forty-five degree angled mirror, exiting the second-ninety-degree-elbow permitting wheelchair bound and small stature individuals the ability to observe at least one person (as an image) through the door peep-hole, identifying them before allowing entry. In this way the present invention promotes safety.

A kit is also described herein including: the door peep viewer assembly, the mounting assembly, and a set of installation (and use) instructions.

A method of use for a door peep viewer system is also described herein comprising the steps of: installing a door peep viewer assembly, lowering a lower cubic portion, viewing through the lower cubic portion, and identifying a person or persons through the door peep viewer assembly. The method may further comprise the step of turning the lower cubic portion left or right as needed.

The present invention holds significant improvements and serves as a door peep viewer system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, door peep viewer systems, constructed and operative according to the teachings of the present invention.

The various embodiments of the present invention will hereinafter be described in conjunction with the appended drawings, wherein like designations denote like elements.

DETAILED DESCRIPTION

Figure 1:
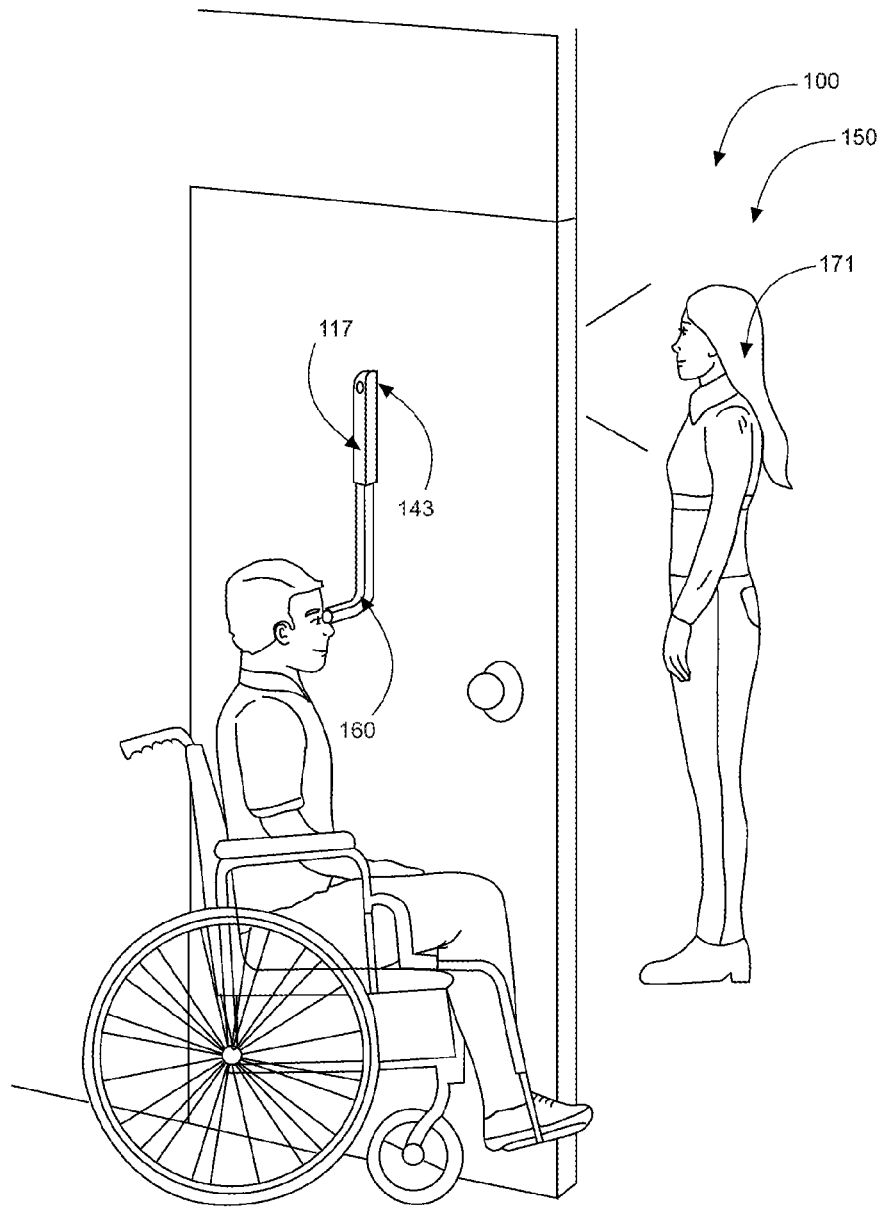
FIG. 1 shows a perspective view illustrating a door peep viewer system during an 'in-use' condition according to an embodiment of the present invention.
Figure 2:
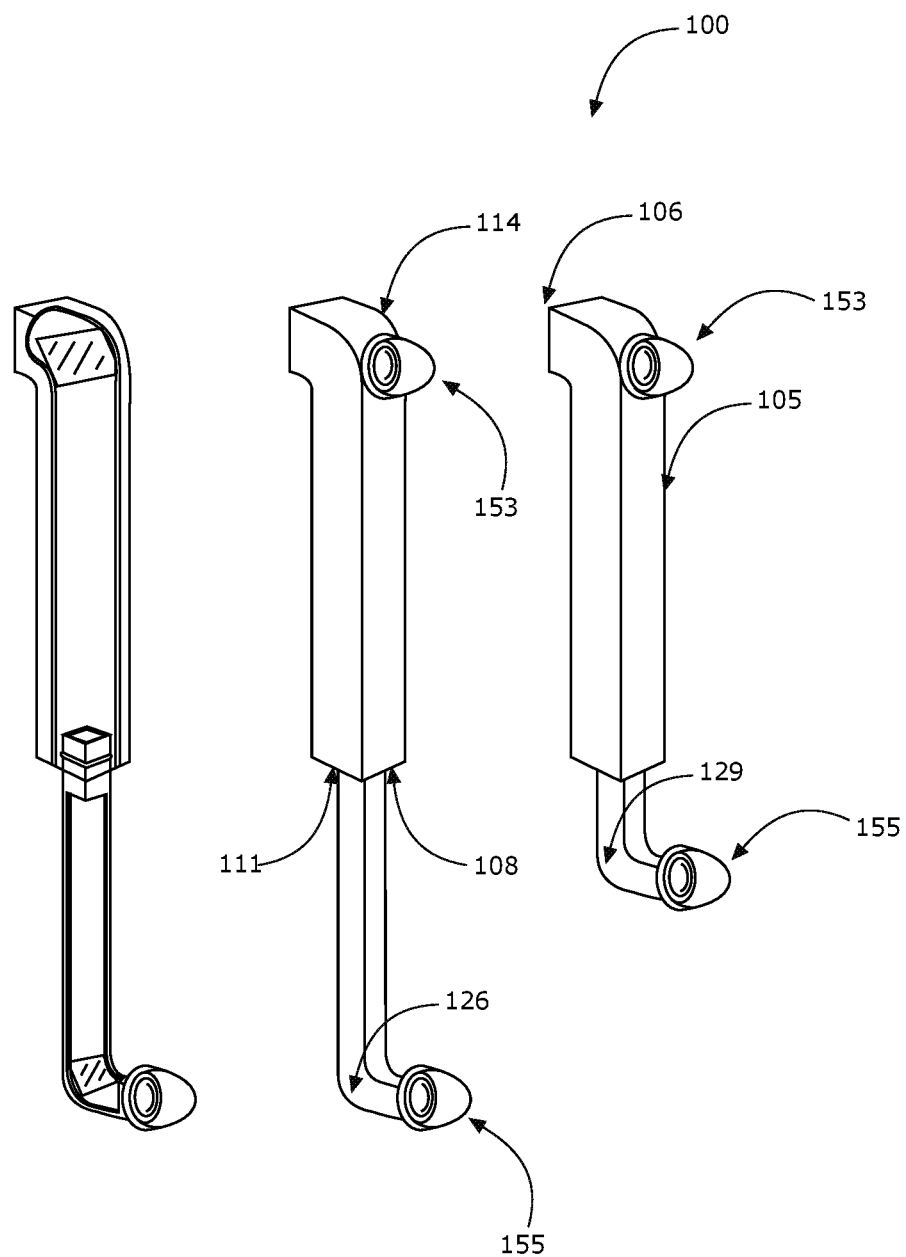
FIG. 2 is a perspective view illustrating a door peep viewer assembly of the door peep viewer system according to an embodiment of the present invention of FIG. 1.
Figure 3:
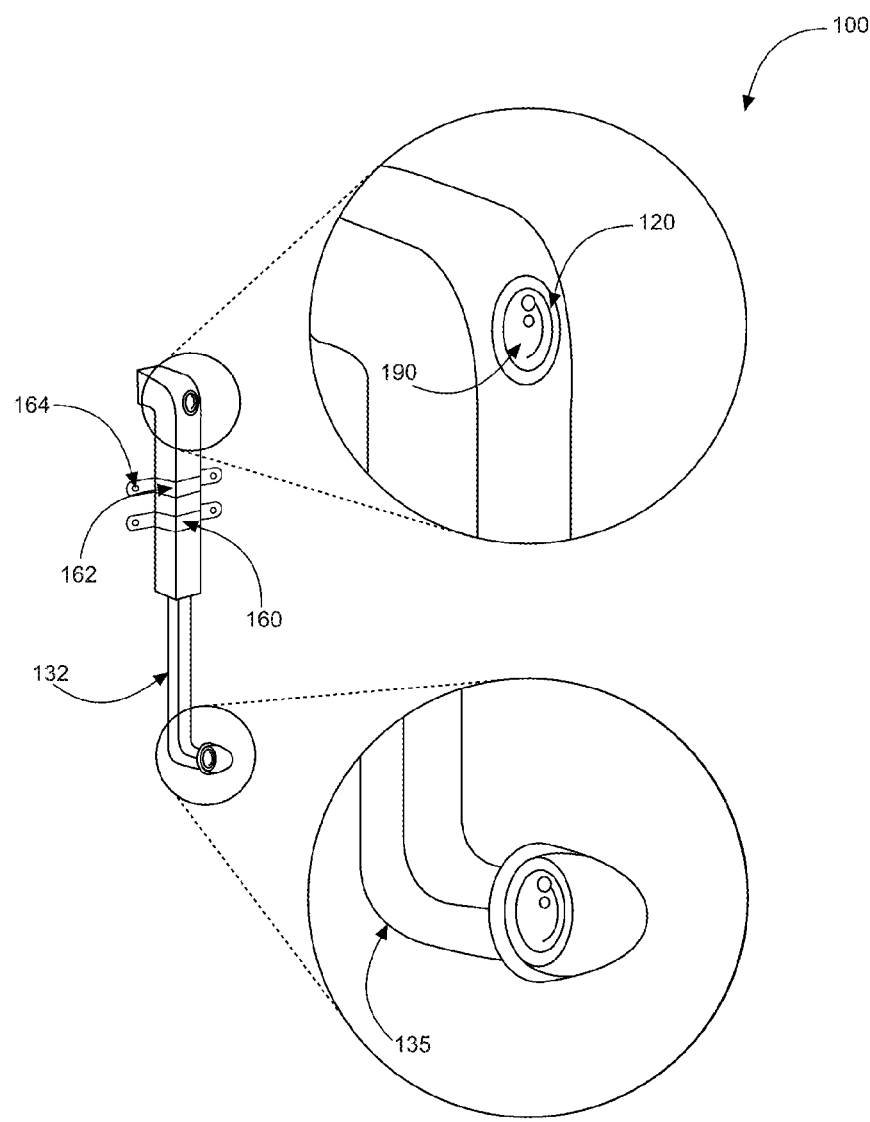
FIG. 3 is a perspective view illustrating the door peep viewer system according to an embodiment of the present invention of FIGS. 1-2.
Figure 4:
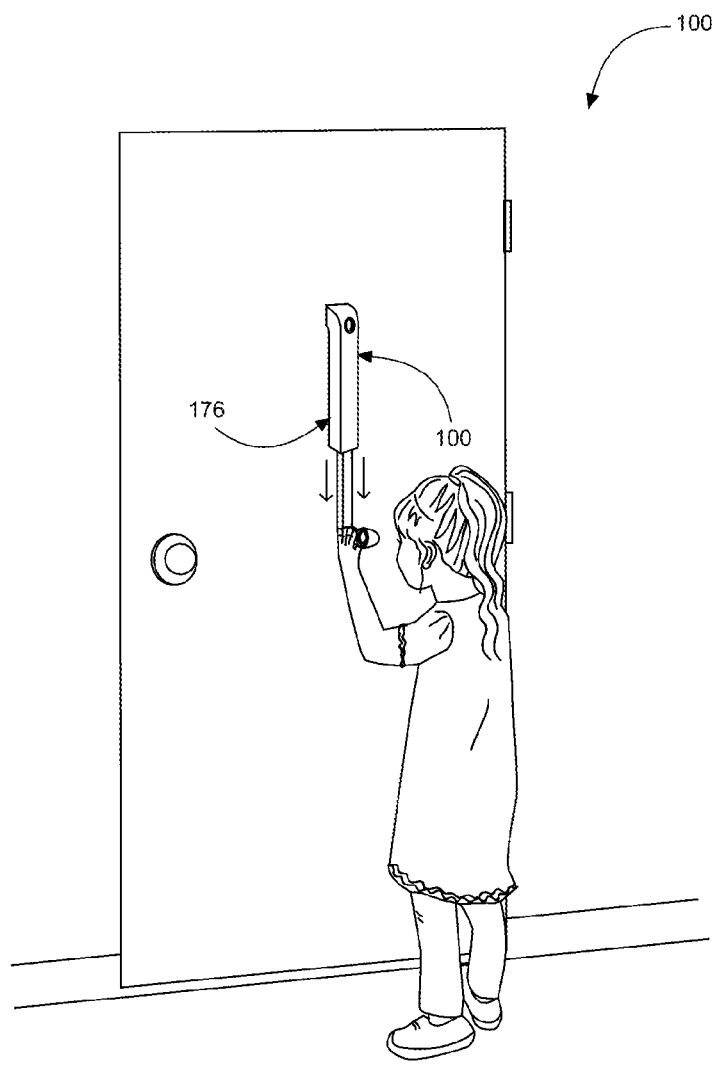
FIG. 4 is a perspective view illustrating the door peep viewer system according to an embodiment of the present invention of FIGS. 1-3.

As discussed above, embodiments of the present invention relate to personal safety devices for use with doors and more particularly to a door peep viewer system as used to improve the ability to readily identify a person at a door through a peep-hole.

Referring to the drawings by numerals of reference there is shown in FIGS. 1-4, various views of door peep viewer system 100 comprising: door peep viewer assembly 101 comprising upper cubic portion 105 comprising first-open-inner-volume 108, receiving aperture 111, first-ninety-degree-elbow 114, first-length 117, two-way scope 120, and top internal two-way forty-five degree angled mirror 123. Lower cubic portion 126 comprises second-open-inner-volume 129, second-length 132, second-ninety-degree-elbow 135, bottom internal forty-five degree angled mirror 137, and mounting assembly 160. As such, door peep viewer system 100 comprises door peep viewer assembly 101.

Door peep viewer assembly 101 comprises in functional combination upper cubic portion 105, lower cubic portion 126, and mounting assembly 160. Upper cubic portion 105 is defined by first-open-inner-volume 108, receiving aperture 111, first-ninety-degree-elbow 114, first-length 117, two-way scope 120, and top internal two-way forty-five degree angled mirror 123.

Upper cubic portion 105 is structured and arranged such that top internal two-way forty-five degree angled mirror 123 is inset within first-ninety-degree-elbow 114 to permit viewing through door peep-hole 143 using two-way scope 120 which is contained and protruding through upper cubic portion 105.

Lower cubic portion 126 is defined by second-open-inner-volume 129, second-length 132, second-ninety-degree-elbow 135, and bottom internal forty-five degree angled mirror 137. Lower cubic portion 126 is slidably coupleable to upper cubic portion 105 such that lower cubic portion 126 is telescopically insertable into upper cubic portion 105 via receiving aperture 111 through first-open-inner-volume 108. Mounting assembly 160 comprises at least one mounting bracket 162, and at least one fastener 164. Fastener(s) 164 may comprise screws or the like.

A visitor (visitor's image) attempting entry 171 is able to be viewed through first-ninety-degree-elbow 114, reflecting off top internal two-way forty-five degree angled mirror 123, descending first-open-inner-volume 108 by way of first-length 117, through second-open-inner-volume 129 of second-length 132, to bottom internal forty-five degree angled mirror 137, and exiting second-ninety-degree-elbow 135. It should be appreciated that the present invention works in the capacity of a novel periscope.

Door peep viewer system 100 permits wheelchair bound and small stature user(s) 140 to observe at least one visitor attempting entry 171 through door peep-hole 143, for the purpose of identifying the visitor attempting entry 171 before allowing entry. Upper cubic portion 105 comprises a fitted molded casting 106 for attaching to door peep-hole 143. Upper cubic portion 105 further preferably comprises first rubber-cupped eye piece 153. Lower cubic portion 126 preferably comprises second rubber-cupped eye piece 155 for comfort in use.

Two-way scope 120 of upper cubic portion 105, in preferred embodiments, comprises a lever activated flip up function allowing view through door peep-hole 143 by user 140. Upper cubic portion 105 and lower cubic portion 126 may comprise light weight durable injection molded thermoplastic 176. Upper cubic portion 105 and lower cubic portion 126 are preferably exactly twelve inches in length, but may be longer or shorter in length depending on door application used in. The light weight durable injection molded thermoplastic 176 of upper cubic portion 105 comprises molded tabs and screw holes; wherein lower cubic portion 126, when extended, pivots right and left.

Upper cubic portion 105 comprises inward curled lip 181 to receive a rubber ring stopper 185; wherein lower cubic portion 126 comprises rubber ring stopper 185 to prevent dislodging from upper cubic portion 105. Two-way scope 120 may comprise a wide angle lens 190 to increase a viewing angle in preferred embodiments.

It should be noted that door peep viewer system 100 may be sold as kit 440 comprising the following parts: at least one door peep viewer assembly 110 at least one mounting assembly 160; and at least one set of user instructions. The kit has instructions such that functional relationships are detailed in relation to the structure of the invention (such that the invention can be used, maintained, or the like in a preferred manner). Door peep viewer system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different lens and telescoping combinations, parts may be sold separately, etc., may be sufficient.

Figure 5:
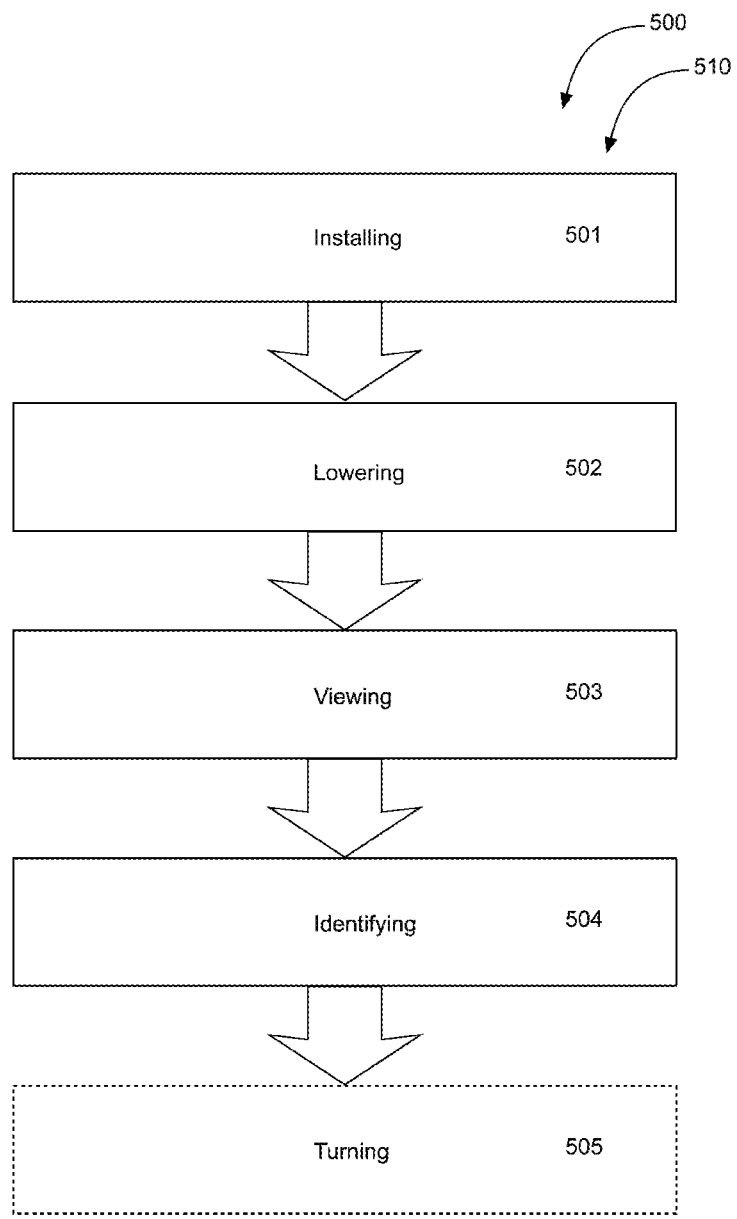
FIG. 5 is a flowchart illustrating a method of use for the door peep viewer system according to an embodiment of the present invention of FIGS. 1-4.

Referring now to FIG. 5 showing flowchart 550 illustrating method of use 500 for door peep viewer system 100 according to an embodiment of the present invention of FIGS. 1-4. As shown, method of use 500 may comprise the steps of: step one 501, installing door peep viewer assembly 101, step two 502, lowering lower cubic portion 126, step three 503, viewing (a person) through lower cubic portion 126, step four 504, identifying the person or persons through door peep viewer assembly 101, and step five 505, turning the lower cubic portion 126 left or right.

It should be noted that step 505 is an optional step and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:

1. A door peep viewer comprising:
an upper portion comprising
an upper tube having two legs and a first 90-degree elbow;
a scope comprising a wide angle lens disposed at an end of the upper tube;
an upper eye piece;
and
an upper forty-five degree angled mirror disposed in the first 90-degree elbow;
a lower portion comprising a lower tube having two legs and a second 90-degree elbow;
a lower forty-five degree angled mirror disposed in the second 90-degree elbow;
and
a lower view hole;
and
a mounting assembly comprising
a mounting bracket;
and
a fastener,
wherein the upper portion and the lower portion connect through a slideable joint;
wherein the upper portion and upper mirror and the lower portion and the lower mirror are arranged to bounce light entering the scope of the upper mirror and then the lower mirror out through the lower view hole.

2. The door peep viewer system of claim 1 wherein the upper portion further comprises a part adapted to attach to the peep-hole.

3. The door peep viewer system of claim 2, wherein the lower portion comprises a lower eye piece.

4. The door peep viewer system of claim 3 wherein the upper portion comprises a lever activated flip up function allowing light entering the scope to be transmitted to the upper eye piece.

5. The door peep viewer system of claim 4 wherein the upper portion and the lower portion comprise aluminum.

6. The door peep viewer system of claim 5 wherein the upper portion and the lower portion comprise light-weight, durable, injection-molded thermoplastic.

7. The door peep viewer system of claim 6 wherein either or both of the upper portion and the lower portion are twelve inches long.

8. The door peep viewer system of claim 7 wherein either or both of the upper portion and the lower portion are less than twelve inches long.

9. The door peep viewer system of claim 8 wherein either or both of the upper portion and the lower portion are greater than twelve inches long.

10. The door peep viewer system of claim 9 wherein the upper portion comprises molded tabs and screw holes.

11. The door peep viewer system of claim 10 wherein the lower portion, pivots right and left.

12. The door peep viewer system of claim 11 wherein the upper portion comprises an inward curled lip to receive a rubber ring stopper.

13. The door peep viewer system of claim 12 wherein the lower portion comprises the rubber ring stopper to prevent removal from the upper portion.

14. The door peep viewer system of claim 9 wherein the upper portion comprises self-adhesive, hook-and-loop fastening tabs.

15. A method comprising providing the door peep viewer system of claim 1.

* * * * *